United States Patent
Deolalikar

(10) Patent No.: US 10,922,346 B2
(45) Date of Patent: Feb. 16, 2021

(54) GENERATING A SUMMARY BASED ON READABILITY

(71) Applicant: HEWLETT PACKARD ENTERPRISE DEVELOPMENT LP, Houston, TX (US)

(72) Inventor: Vinay Deolalikar, Cupertino, CA (US)

(73) Assignee: Micro Focus LLC, Santa Clara, CA (US)

(*) Notice: Subject to any disclaimer, the term of this patent is extended or adjusted under 35 U.S.C. 154(b) by 625 days.

(21) Appl. No.: 15/621,263

(22) Filed: Jun. 13, 2017

(65) Prior Publication Data
US 2017/0277781 A1    Sep. 28, 2017

Related U.S. Application Data

(63) Continuation of application No. 13/870,267, filed on Apr. 25, 2013, now Pat. No. 9,727,641.

(51) Int. Cl.
*G06F 16/34*    (2019.01)
(52) U.S. Cl.
CPC .................. *G06F 16/345* (2019.01)
(58) Field of Classification Search
CPC .................................................. G06F 16/345
See application file for complete search history.

(56) References Cited

U.S. PATENT DOCUMENTS

| | | | |
|---|---|---|---|
| 4,773,009 A | 9/1988 | Kucera | |
| 5,924,108 A | 7/1999 | Fein | |
| 6,205,456 B1 | 3/2001 | Nakao | |
| 6,493,663 B1 | 12/2002 | Ueda | |
| 6,519,586 B2 * | 2/2003 | Anick | G06F 16/951 707/742 |
| 6,789,230 B2 | 9/2004 | Katariya | |
| 6,953,343 B2 * | 10/2005 | Townshend | G09B 7/04 434/178 |
| 7,092,872 B2 | 8/2006 | Polanyi | |
| 7,251,781 B2 | 7/2007 | Batchilo | |
| 7,376,893 B2 * | 5/2008 | Chen | G06F 16/345 715/254 |
| 7,389,289 B2 * | 6/2008 | Solaro | G06F 16/951 707/711 |

(Continued)

FOREIGN PATENT DOCUMENTS

CN        101739426 A    6/2010

OTHER PUBLICATIONS

Bosma, W et al, "Query-based Extracting: How to Support the Answer?", Aug. 15, 2006 (7 pages).

(Continued)

*Primary Examiner* — Miranda Le

(57) ABSTRACT

In some examples, a set of sentences is extracted from a digital document, and each sentence is scored using a respective informativeness measure and readability measure. Sentences in the set of sentences are selected based on the readability measures and informativeness measures. A low readability, high informativeness sentence is identified from the set of sentences. A concatenated sentence is generated by concatenating at least one contextual sentence with the low readability, high informativeness sentence, where the concatenated sentence has a higher readability than the low readability, high informativeness sentence.

17 Claims, 2 Drawing Sheets

(56) References Cited

U.S. PATENT DOCUMENTS

| | | |
|---|---|---|
| 7,809,548 B2 | 10/2010 | Mihalcea |
| 8,082,248 B2 | 12/2011 | Abouyounes |
| 8,176,418 B2 | 5/2012 | McKeown et al. |
| 8,271,502 B2 | 9/2012 | Svore |
| 8,346,745 B2 | 1/2013 | Umemoto |
| 8,594,998 B2 | 11/2013 | Litvak |
| 8,606,778 B1* | 12/2013 | Harik ............... G06F 16/951 |
| | | 707/729 |
| 8,650,483 B2 | 2/2014 | Liu |
| 8,700,382 B2* | 4/2014 | Rappoport ............ G09B 7/02 |
| | | 434/178 |
| 8,744,855 B1 | 6/2014 | Rausch ............... G06F 17/27 |
| | | 235/375 |
| 8,954,423 B2* | 2/2015 | Chica ................ G06F 17/27 |
| | | 707/723 |
| 8,984,398 B2 | 3/2015 | Kanungo |
| 9,020,808 B2 | 4/2015 | Branton |
| 2003/0068603 A1* | 4/2003 | Cupp ................. G09B 17/00 |
| | | 434/178 |
| 2004/0117740 A1 | 6/2004 | Chen |
| 2005/0193335 A1* | 9/2005 | Dorai ................ G06F 16/972 |
| | | 715/234 |
| 2005/0262214 A1 | 11/2005 | Bagga |
| 2005/0278325 A1 | 12/2005 | Mihalcea |
| 2006/0095841 A1 | 5/2006 | Oikawa |
| 2006/0212423 A1* | 9/2006 | Jones ................. G06F 16/951 |
| 2006/0282413 A1 | 12/2006 | Bondi |
| 2007/0065795 A1* | 3/2007 | Erickson ............... G09B 5/06 |
| | | 434/307 R |
| 2007/0067294 A1* | 3/2007 | Ward ................ G06F 16/9535 |
| 2008/0070205 A1 | 3/2008 | Amick |
| 2009/0006080 A1 | 1/2009 | Fuji |
| 2009/0083026 A1* | 3/2009 | Morsy ............... G06F 16/345 |
| | | 704/9 |
| 2009/0197225 A1* | 8/2009 | Sheehan ............. G09B 17/00 |
| | | 434/169 |
| 2010/0185943 A1 | 7/2010 | Wang |
| 2010/0257159 A1 | 10/2010 | Uematsu |
| 2010/0287162 A1* | 11/2010 | Shirwadkar ......... G06F 16/3338 |
| | | 707/740 |
| 2011/0099003 A1* | 4/2011 | Isozu ................. G06F 16/93 |
| | | 704/9 |
| 2014/0180991 A1* | 6/2014 | Cudak .............. G06Q 30/0264 |
| | | 706/46 |
| 2014/0229159 A1* | 8/2014 | Branton ............. G06F 16/345 |
| | | 704/9 |
| 2015/0095770 A1 | 4/2015 | Mani |

OTHER PUBLICATIONS

Jagadeesh, J et al, "Sentence Extraction Based Single Document Summarization", Jul. 2008 (6 pages).

Qazvinian, V, et al, Summarising Text with a Genetic Algorithm-Based Sentence Extraction, Jul. 18, 2008 (19 pages).

* cited by examiner

GENERATING A SUMMARY BASED ON READABILITY

CROSS REFERENCE TO RELATED APPLICATIONS

This is a continuation of U.S. application Ser. No. 13/870,267, filed Apr. 25, 2013, which is hereby incorporated by reference in its entirety.

BACKGROUND

With the advent of computers and digital representation of documents, methods for automated summarization of documents have been proposed. One approach involves generating a summary of a document using entire sentences extracted from the document. By using extracted sentences, as opposed to text segments, the resulting summary is ensured a certain level of readability and coherence, since full, presumably grammatically correct sentences are being used to generate the summary.

In order to determine which sentences to include in the summary, the extracted sentences may be scored based on an informativeness measure. An informativeness measure may indicate whether a given sentence includes information that is likely to inform a reader regarding the content of the document. Sentences having high informativeness scores may thus be selected for inclusion in the summary.

BRIEF DESCRIPTION OF DRAWINGS

The following detailed description refers to the drawings, wherein.

DETAILED DESCRIPTION

According to an example, a summarization technique may consider the readability of extracted sentences when generating a summary. For instance, a method for generating a readable summary may include extracting a set of sentences from a document. Each sentence may be scored based on an informativeness measure. Each sentence may also be scored based on a readability measure. Sentences may be selected for inclusion in the summary based on the readability and informativeness scores. In some examples, highly informative sentences that have low readability may still be selected for inclusion in the summary by concatenating a contextual sentence to the highly informative sentence so as to improve readability. The contextual sentence may be a sentence immediately preceding or following the highly informative sentence.

As a result, a summary may be generated that not only informs a reader of the content of the document, but is also easier to read. This technique may be especially useful for complex documents, where the most informative sentences may score low with respect to readability. This technique may also be useful for generating a summary of a document in a language for non-native speakers of the language. Additional examples, advantages, features, modifications and the like are described below with reference to the drawings.

Figure 1:
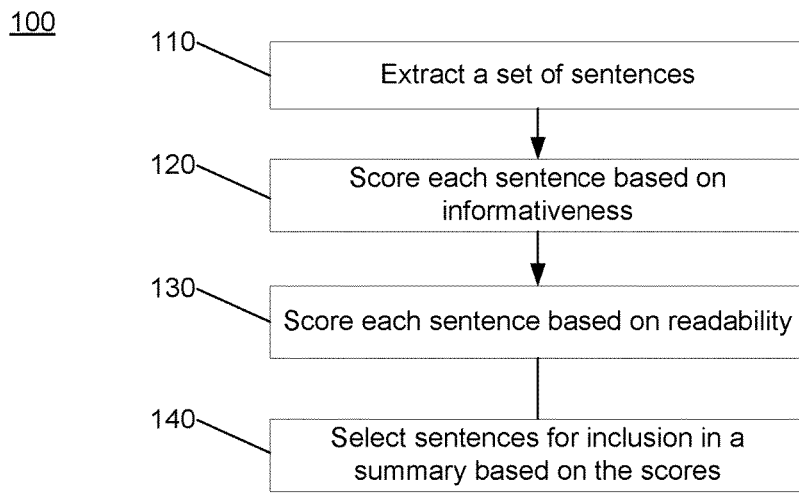
FIG. 1 illustrates a method of selecting sentences for inclusion in a summary based on a readability score, according to an example.

FIG. 1 illustrates a method of selecting sentences for inclusion in a summary based on a readability score, according to an example. Method 100 may be performed by a computing device, system, or computer, such as computing system 400 or computer 500. Computer-readable instructions for implementing method 100 may be stored on a computer readable storage medium. These instructions as stored on the medium are referred to herein as "modules" and may be executed by a computer.

Method 100 may begin at 110, where a set of sentences may be extracted from a document. In the case of multi-document summarization, the set of sentences may be extracted from a collection of documents being summarized. A document may be a collection of information represented in electronic form, the collection of information relating to a single work. Examples of works may be articles, books, reports, manuals, and the like. An extracted sentence is a grammatical sentence from the work. The sentences may be extracted using any of various extraction techniques, such as with the assistance of a grammatical parser.

At 120, each extracted sentence may be scored based on an informativeness measure. Scoring based on informativeness assigns a score to each sentence indicating how informative the sentence is regarding the content of the document being summarized. Various informativeness measures may be used to score the set of sentences. For example, heuristics as embodied by informativeness measures such as TextRank, LexRank, and PageRank may be used to measure the informativeness of a sentence. These techniques may be based on similarity scores, which score a sentence based on how similar it is to other sentences in the set of sentences. High similarity generally corresponds with high informativeness. Other heuristics may be used as well, such as whether a sentence contains words found in the title or subtitles of the document. In addition, the location of the sentence in the document may also be used to measure informativeness, as a first or final sentence in a paragraph may tend to have a greater degree of informativeness. Also, the tf-idf value may be calculated for individual words to determine key words in the document, so that sentences containing those words may be scored as more informative.

At 130, each extracted sentence may be scored based on a readability measure. Scoring based on readability assigns a score to each sentences indicating how readable the sentence is. Readability represents the ease in which text can be read and understood. Various readability measures may be used to score the set of sentences. For example, the sentences may be scored based on any of various readability formula, such as the Flesch formulas, the Dale-Chall formula, the Gunning Fog formula, the Fry Readability graph, the McLaughlin SMOG formula, and the FORCAST formula. These formulas measure readability based on various heuristics, such as the number of words in the sentence, the number of syllables per word, whether the words of the sentence can be found on a reading list, the frequency of the word according to a vocabulary frequency list, and the like. These heuristics may be modified for a particular context. For example, for documents relating to a particular domain, such as Information Technology documents stored in a database of an Information Technology company, a reading list may include terms that are frequently encountered and understood by individuals from that domain. Thus, the readability score may indicate readability for someone coming from that domain. As another example, if the summary being generated is to be used by non-native speakers, the heuristics may be modified to reflect readability levels for non-native speakers.

Figure 2:
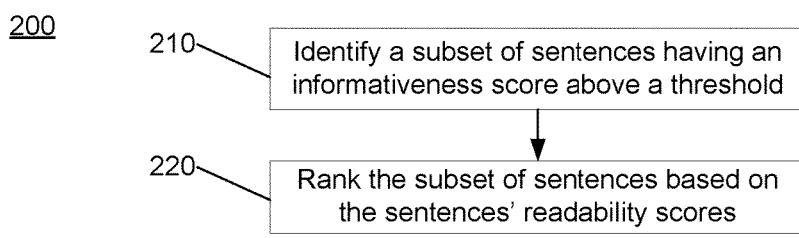
FIG. 2 illustrates a method of ranking sentences based on a readability score, according to an example.

At 140, sentences may be selected for inclusion in a summary based on the readability scores and the informativeness scores. In one example, the sentences may be selected based on any of various ranking methods. For instance, briefly turning to FIG. 2, an example method of ranking sentences based on readability and informativeness scores is illustrated. Method 200 may begin at 210, where a subset of sentences having an informativeness score above a threshold may be identified. The threshold may represent a minimum level of informativeness. In an example, the threshold value may be determined based on the distribution of informativeness scores of the set of sentences. In another example, the threshold value may be a predetermined level, which may be lowered if not enough sentences may the threshold. At 220, the subset of sentences may then be ranked based on the sentences' readability scores. Sentences having high readability scores (where "high" indicates good readability) may be selected for inclusion in the summary. Sentences may be selected in this fashion until a threshold is reached, such as a maximum limit. For example, the maximum limit may be a maximum number of sentences or a maximum number of characters.

Instead of a ranking method, a linear programming optimization may be applied to select sentences for inclusion in the summary. The linear programming optimization may maximize the informativeness and readability of the resulting summary, as measured by the informativeness scores and readability scores of the sentences. Any of various linear programming packages or tools may be used to generate the linear program. While the linear programming optimization may be mathematically optimal, a ranking method as described above may be more intuitive and allow for easier modification of the method if a resulting summary is of low quality.

In an example modification of method 100, before a sentence is selected for inclusion in the summary, the sentence may be compared with sentences already selected for inclusion in the summary to determine whether the sentence being added is diverse relative to these previously selected sentences. Various heuristics and techniques for making this comparison may be used, such as similarity scores, Cross-Sentence Information Subsumption (CSIS), and Maximal Marginal Relevance (MMR).

Figure 3:
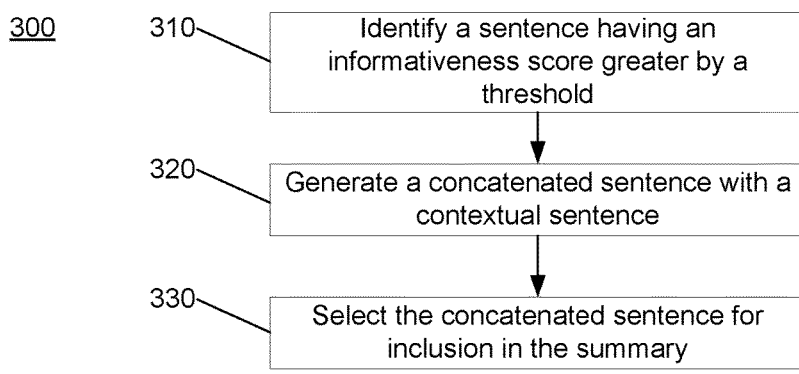
FIG. 3 illustrates a method of generating a concatenated sentence for inclusion in a summary, according to an example.

FIG. 3 illustrates a method of generating a concatenated sentence for inclusion in a summary, according to an example. Method 300 shows a variation that may be used to modify method 100. Method 300 may be performed by a computing device, system, or computer, such as computing system 400 or computer 500. Computer-readable instructions for implementing method 300 may be stored on a computer readable storage medium. These instructions as stored on the medium are referred to herein as "modules" and may be executed by a computer.

Method 300 may be used to ensure that highly informative sentences are included in the summary even if the sentence's readability score is low. Method 300 may begin at 310, where a sentence in the set is identified, the sentence having an informativeness score greater by a first threshold than the remaining sentences in the set but having a readability score below a second threshold. The first threshold may be a predetermined threshold, and may simply require that the sentence have a higher informativeness score than the remaining sentences in the set. Alternatively, the threshold may be set higher, such that only sentences having an informativeness score higher by a more significant amount are identified. The second threshold may be a minimum level of readability, and may be a predetermined threshold or may be determined based on the distribution of readability scores of the sentences in the set.

At 320, a concatenated sentence may be generated by concatenating at least one contextual sentence to the identified sentence. The contextual sentence may be a sentence preceding or following the identified sentence in the document, such as an immediately preceding or immediately following sentence. The contextual sentence is referred to as "contextual" because it is presumed to provide context for the identified sentence, and thus may increase the concatenated sentence's readability above that of the identified sentence alone. At 330, the concatenated sentence may be selected for inclusion in the summary. In another example, the readability of the concatenated sentence may be scored using the readability measure, and the concatenated sentence may be selected for inclusion in the summary only if the concatenated sentence's readability meets a threshold, such as meeting a predetermined threshold amount or exceeding the readability score of the identified sentence by a threshold amount.

Figure 4:
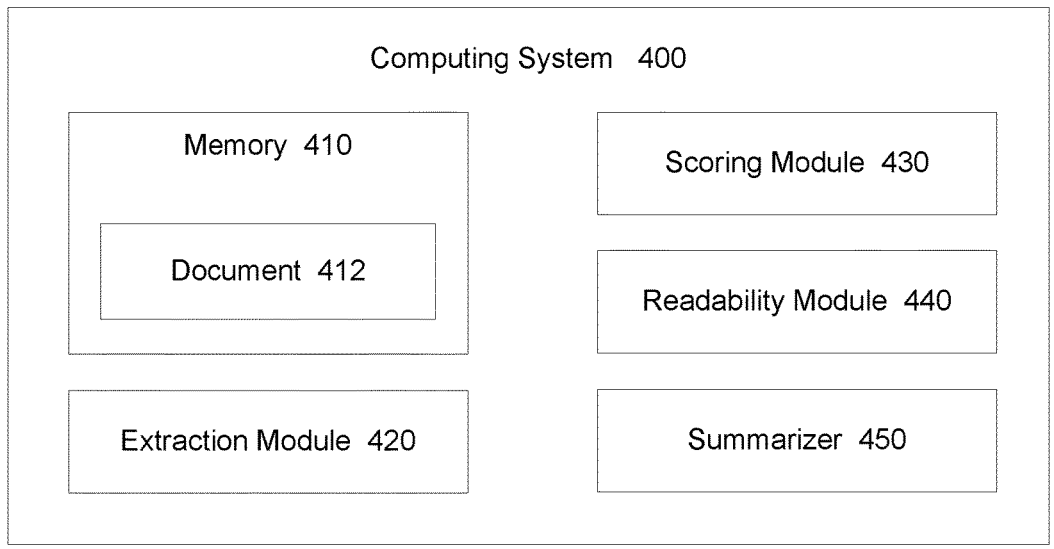
FIG. 4 illustrates a system for generating a summary, according to an example.

FIG. 4 illustrates a system for generating a summary, according to an example. Computing system 400 may include and/or be implemented by one or more computers. For example, the computers may be server computers, workstation computers, desktop computers, or the like. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, computing system 400 may include one or more machine-readable storage media separate from the one or more controllers, such as memory 410.

Computing system 400 may include memory 410, extraction module 420, scoring module 430, and readability module 440, and summarizer 450. Each of these components may be implemented by a single computer or multiple computers. The components may include software, one or more machine-readable media for storing the software, and one or more processors for executing the software. Software may be a computer program comprising machine-executable instructions.

In addition, users of computing system 400 may interact with computing system 400 through one or more other computers, which may or may not be considered part of computing system 400. As an example, a user may interact with system 400 via a computer application residing on system 400 or on another computer, such as a desktop computer, workstation computer, tablet computer, or the like. The computer application can include a user interface.

Computer system 400 may perform methods 100-300, and variations thereof, and components 420-450 may be configured to perform various portions of methods 100-300, and variations thereof. Additionally, the functionality implemented by components 420-450 may be part of a larger software platform, system, application, or the like. For example, these components may be part of a data analysis system.

In an example, memory 410 may be configured to store at least one document 412. Extraction module 420 may be configured to extract a plurality of sentences from document 412. Scoring module 430 may be configured to identify sentences for inclusion in a summary of the document based on a criterion. The criterion may be informativeness, as measured by an informativeness measure as described relative to FIG. 1. The scoring module may be configured to assign a score to each identified sentence indicating its suitability for inclusion in the summary based on the criterion. Readability module 440 may be configured to evaluate the readability of the identified sentences according to a readability measure. Summarizer 450 may be configured to select sentences for inclusion in a summary based in part on the evaluated readability of the identified sentences.

System 400 may additionally include a ranking module configured to rank the identified sentences based on the evaluated readability and the assigned scores. Summarizer 450 may be further configured to select the sentences for inclusion in the summary based on the ranking generated by the ranking module. Summarizer 450 may also include a context module. The context module may be configured to add a contextual sentence to a selected sentence. The contextual sentence may be a sentence preceding or following the selected sentence in the document. Context module may be configured to perform method 300.

Figure 5:
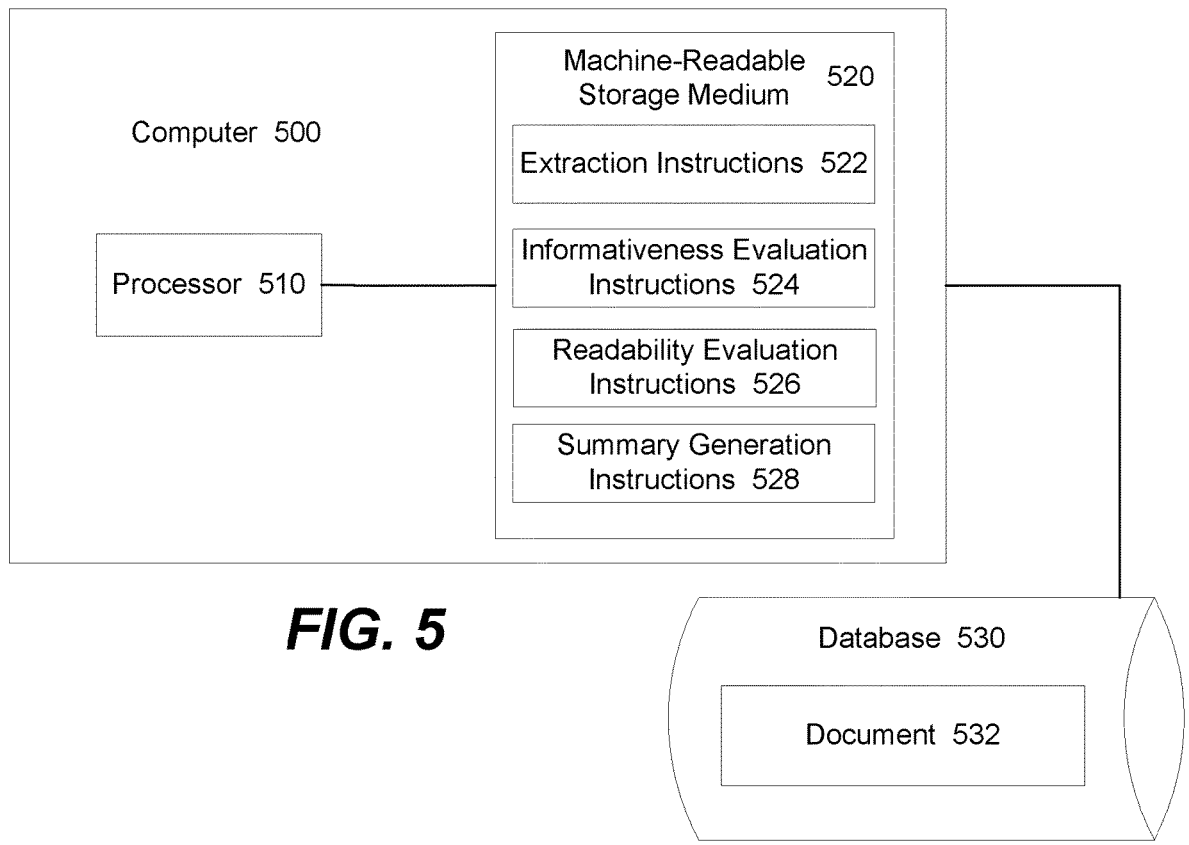
FIG. 5 illustrates a computer-readable medium for generating a summary, according to an example.

FIG. 5 illustrates a computer-readable medium for generating a summary, according to an example. Computer 500 may be any of a variety of computing devices or systems, such as described with respect to computing system 400.

Computer 500 may have access to database 530. Database 530 may include one or more computers, and may include one or more controllers and machine-readable storage mediums, as described herein. Computer 500 may be connected to database 530 via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

Processor 510 may be at least one central processing unit (CPU), at least one semiconductor-based microprocessor, other hardware devices or processing elements suitable to retrieve and execute instructions stored in machine-readable storage medium 520, or combinations thereof. Processor 510 can include single or multiple cores on a chip, multiple cores across multiple chips, multiple cores across multiple devices, or combinations thereof. Processor 510 may fetch, decode, and execute instructions 522-528 among others, to implement various processing. As an alternative or in addition to retrieving and executing instructions, processor 510 may include at least one integrated circuit (IC), other control logic, other electronic circuits, or combinations thereof that include a number of electronic components for performing the functionality of instructions 522-528. Accordingly, processor 510 may be implemented across multiple processing units and instructions 522-528 may be implemented by different processing units in different areas of computer 500.

Machine-readable storage medium 520 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 520 can be computer-readable and non-transitory. Machine-readable storage medium 520 may be encoded with a series of executable instructions for managing processing elements.

The instructions 522-528 when executed by processor 510 (e.g., via one processing element or multiple processing elements of the processor) can cause processor 510 to perform processes, for example, methods 100-300, and variations thereof. Furthermore, computer 500 may be similar to computing system 400 and may have similar functionality and be used in similar ways, as described above.

For example, extraction instructions 522 may cause processor 510 to extract a set of sentences from a document 532 or group of documents stored in database 530. Informativeness evaluation instructions 524 may cause processor 510 to evaluate each sentence of the set of sentences for informativeness. Readability evaluation instructions 526 may cause processor 510 to evaluate each sentence of the set of sentences for readability based on a readability measure. Summary generation instructions 528 may cause processor 510 to generate a summary by adding sentences to the summary based on the informativeness and readability evaluations. For example, sentences may be ranked based on the informativeness and readability evaluations. An example ranking methodology includes identifying a subset of sentences having an evaluated informativeness above a threshold and ranking the subset of sentences based on the readability evaluations of the sentences. Sentences may be selected for inclusion in the summary based on the ranking.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method executed by a computer system, comprising:
extracting a set of sentences from a digital document;
scoring, by a computer, each respective sentence of the set of sentences using a respective informativeness measure that is computed:
i) based on a similarity score representing a similarity of the respective sentence with at least one other sentence of the set of sentences, and
ii) based on a number of words in the respective sentence that have term frequency-inverse document frequency (tf-idf) values indicating that the number of words are key words;
scoring each respective sentence of the set of sentences using a respective readability measure that is calculated based on a number of words in the respective sentence that are on a reading list;
selecting selected sentences in the set of sentences based on the respective readability measures and the respective informativeness measures, wherein the selected sentences in the set of sentences are selected using a linear program optimization that maximizes informativeness and readability of an electronic readable summary as measured by the respective informativeness measures and the respective readability measures of the respective sentences in the set of sentences;
identifying a low readability, high informativeness sentence from the set of sentences, wherein the low readability, high informativeness sentence has an informativeness measure that is greater than informativeness measures of other sentences of the set of sentences, and has a readability measure that is less than readability measures of the other sentences;
creating a concatenated sentence by concatenating at least one contextual sentence with the low readability, high informativeness sentence, wherein the concatenated sentence has a higher readability than the low readability, high informativeness sentence;
computing a readability measure of the concatenated sentence satisfying a specified criterion; and
generating the electronic readable summary of the digital document, the electronic readable summary including the concatenated sentence and the selected sentences.

2. The method of claim 1, wherein the readability measure for each respective sentence of the set of sentences is further based on a number of syllables per word in the respective sentence.

3. The method of claim 1, further comprising ranking sentences in the set of sentences based on the respective readability measures and the respective informativeness measures.

4. The method of claim 1, wherein the selecting comprises:
identifying a respective sentence in the set of sentences having an informativeness measure greater than a first threshold, but having a readability measure below a second threshold.

5. The method of claim 1, wherein the at least one contextual sentence comprises a sentence preceding or following the identified low readability, high informativeness sentence in the digital document.

6. The method of claim 1, wherein the specified criterion comprises a threshold, and including the concatenated sentence in the electronic readable summary is in response to the readability measure of the concatenated sentence exceeding the threshold.

7. The method of claim 1, wherein the specified criterion comprises a threshold amount greater than a readability measure of the low readability, high informativeness sentence, and including the concatenated sentence in the electronic readable summary is in response to the readability measure of the concatenated sentence exceeding the readability measure of the low readability, high informativeness sentence by greater than the threshold amount.

8. A system comprising:
a processor; and
a non-transitory storage medium storing instructions executable on the processor to: extract a plurality of sentences from a digital document;
select sentences from the plurality of sentences based on obtaining informativeness measures and readability measures of the sentences of the plurality of sentences by:
scoring a respective informativeness measure of each respective sentence of the plurality of sentences that is computed:
i) based on a similarity score representing a similarity of the respective sentence with at least one other sentence of the plurality of sentences, and
ii) based on a number of words in the respective sentence that have term frequency-inverse document frequency (tf-idf) values indicating that the number of words are key words, and
scoring a respective readability measure of each respective sentence of the plurality of sentences that is calculated based on a number of words in the respective sentence that are on a reading list;
wherein the selected sentences are selected using a linear program optimization that maximizes informativeness and readability of an electronic readable summary as measured by the respective informativeness measures and the respective readability measures of the respective sentences in the plurality of sentences;
add a low readability, high informativeness sentence to at least one of the selected sentences to create a concatenated sentence, wherein the concatenated sentence has a higher readability than the low readability, high informativeness sentence, and wherein the low readability, high informativeness sentence has an informativeness measure that is greater than informativeness measures of other sentences of the plurality of sentences, and has a readability measure that is less than readability measures of the other sentences;
computing a readability measure of the concatenated sentence satisfying a specified criterion; and
generate the electronic readable summary of the digital document, the electronic readable summary including the concatenated sentence.

9. The system of claim 8, wherein the respective readability measure of each respective sentence is further based on a number of syllables per word in the respective sentence.

10. The system of claim 8, wherein the selecting of the sentences comprises:
determining a subset of sentences from the plurality of sentences, wherein the respective sentences in the subset of sentences have respective informativeness measures greater than a threshold, and
selecting, from the subset of sentences, the selected sentences based on a ranking of the respective sentences in the subset of sentences according to respective readability measures of the respective sentences in the subset of sentences.

11. The system of claim 10, wherein the instructions are executable on the processor to compute the threshold based on a distribution of the respective informativeness measures of the plurality of sentences.

12. The system of claim 8, wherein the instructions are executable on the processor to:
- compute a readability measure of the concatenated sentence; and
- include the concatenated sentence in the electronic readable summary in response to the readability measure of the concatenated sentence satisfying a specified criterion.

13. A non-transitory computer readable storage medium storing instructions that when executed cause a computer system to:
- assign a respective informativeness measure and a respective readability measure to each respective sentence of a set of sentences in a digital document;
- scoring the respective informativeness measure by computing:
  i) based on a similarity score representing a similarity of the respective sentence with at least one other sentence of the set of sentences, and
  ii) based on a number of words in the respective sentence that have term frequency-inverse document frequency (tf-idf) values indicating that the number of words are key words, and wherein
- scoring the respective readability measure is based on calculating a number of words in the respective sentence that are on a reading list;
- select selected sentences in the set of sentences based on the respective readability measures and the respective informativeness measures, wherein the selecting comprises:
  i) determining a subset of sentences from the set of sentences, wherein the respective sentences in the subset of sentences have respective informativeness measures greater than a threshold, and
  ii) selecting, from the subset of sentences, the selected sentences based on a ranking of the respective sentences in the subset of sentences according to respective readability measures of the respective sentences in the subset of sentences; and
  iii) identify a low readability, high informativeness sentence from the set of sentences, wherein the low readability, high informativeness sentence has an informativeness measure that is greater than respective informativeness measures of other sentences of the set of sentences, and has a respective readability measure that is less than respective readability measures of the other sentences,
- wherein the selected sentences are selected using a linear program optimization that maximizes informativeness and readability of an electronic readable summary as measured by the respective informativeness measures and the respective readability measures of the respective sentences in the set of sentences;
- create a concatenated sentence by concatenating at least one contextual sentence with the low readability, high informativeness sentence, wherein the concatenated sentence has a higher readability than the low readability, high informativeness sentence;
- computing a readability measure of the concatenated sentence satisfying a specified criterion; and
- generate the electronic readable summary of the digital document by adding the selected sentences and the concatenated sentence to the electronic readable summary.

14. The non-transitory computer readable storage medium of claim 13, wherein the at least one contextual sentence comprises a sentence preceding or following the identified low readability, high informativeness sentence in the digital document.

15. The non-transitory computer readable storage medium of claim 13, wherein the specified criterion comprises a given threshold, and including the concatenated sentence in the electronic readable summary is in response to the readability measure of the concatenated sentence exceeding the given threshold.

16. The non-transitory computer readable storage medium of claim 13, wherein the specified criterion comprises a threshold amount greater than a readability measure of the low readability, high informativeness sentence, and including the concatenated sentence in the electronic readable summary is in response to the readability measure of the concatenated sentence exceeding the readability measure of the low readability, high informativeness sentence by greater than the threshold amount.

17. The non-transitory computer readable storage medium of claim 13, wherein the instructions when executed cause the computer system to compute the threshold based on a distribution of the respective informativeness measures of the set of sentences.

* * * * *